United States Patent

Cook

[11] 4,117,724
[45] Oct. 3, 1978

[54] AMBIENT PRESSURE SENSOR
[75] Inventor: John E. Cook, Chatham, Canada
[73] Assignee: Fram Corporation, East Providence, R.I.
[21] Appl. No.: 831,219
[22] Filed: Sep. 7, 1977
[51] Int. Cl.$^2$ .......................... G01L 7/12; G01L 9/02
[52] U.S. Cl. ...................................... 73/386; 73/701; 73/725; 73/729
[58] Field of Search ................. 73/701, 719, 725, 729, 73/386, 387, 746, 745; 338/41, 39, 42

[56] References Cited

U.S. PATENT DOCUMENTS

| Re. 24,597 | 2/1959 | Lones et al. | 338/41 |
| 3,256,740 | 6/1966 | Tate et al. | 73/701 |

*Primary Examiner*—Donald O. Woodiel
*Attorney, Agent, or Firm*—Ken C. Decker; W. N. Antonis

[57] ABSTRACT

An ambient pressure sensor generates an electrical signal which varies in response to changes in ambient pressure level. The sensor includes a sealed bellows or aneroid which varies in length as the ambient pressure varies. A fluid motor including a piston slidably mounted within the housing carries a tube which extends to a position adjacent one end of the aneroid. The end of the tube defines a valve seat which cooperates with a valve member carried on the end of the aneroid to control communication of atmospheric pressure through the tube and into the power chamber defined between the piston and the end of the housing. The power chamber is connected with a vacuum source, so the atmospheric pressure communicated through the tube varies the pressure level in the power chamber as a function of ambient atmospheric pressure, since the aneroid controls communication through the tube. Consequently, the piston and tube move relative to the housing as the ambient pressure changes. A potentiometer includes a wiper which is carried by the tube. The wiper is moved along a resistance within the potentiometer, to thereby generate an electrical signal which varies depending upon the position of the tube.

13 Claims, 1 Drawing Figure

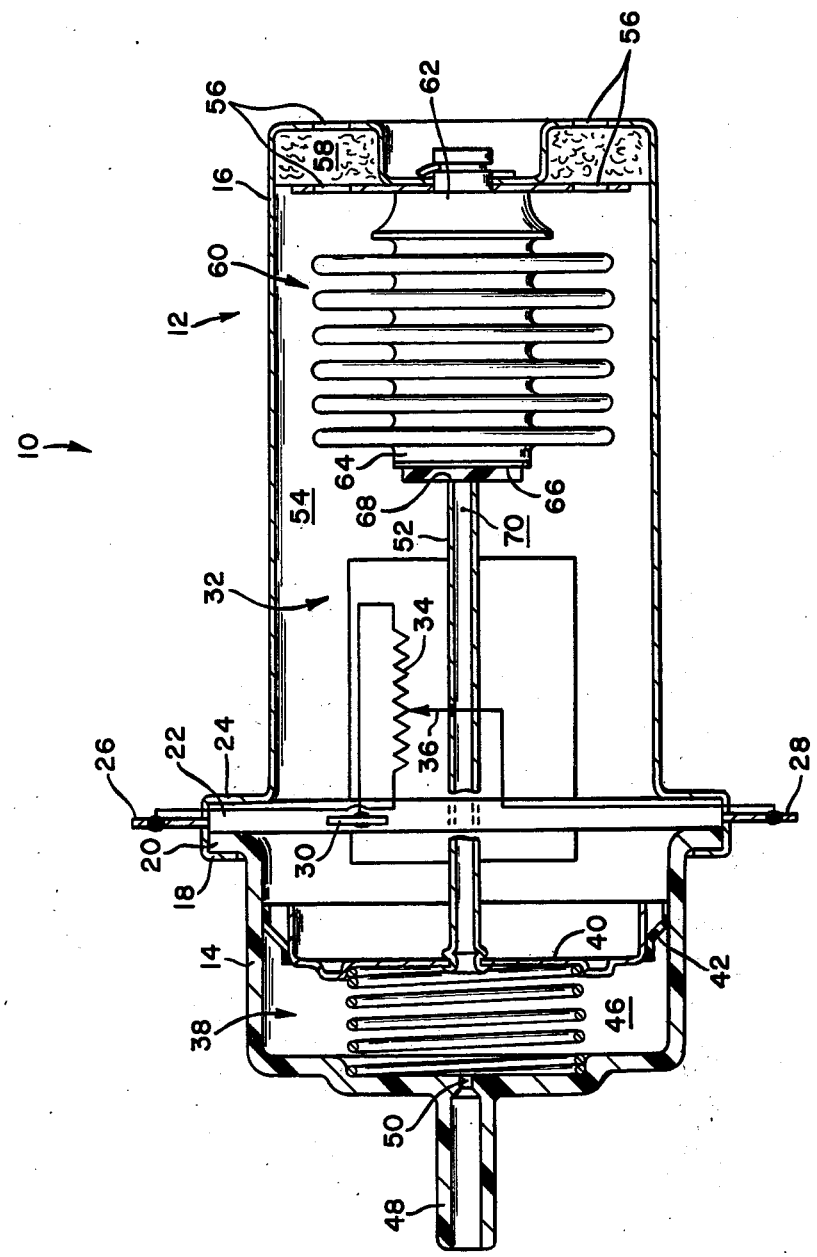

AMBIENT PRESSURE SENSOR

BACKGROUND OF THE INVENTION

This invention relates to an ambient pressure sensor for providing an electrical signal which varies in response to changes in ambient pressure level.

Modern automobiles, particularly those which include electronic fuel management systems or which include relatively complicated pollution control mechanisms, require a device which generates an electrical signal which varies as a function of the ambient pressure level. Prior art devices of this type generally provide a potentiometer which is actuated directly by an aneroid to thereby directly generate an electrical signal which varies as a function of the pressure level sensed by the aneroid. However, the forces generated by aneroids are relatively small, and considerable inaccuracies have been experienced in using the prior art devices. These inaccuracies are, in part, due to a reduction in the drag on the potentiometer as the wiper used within the potentiometer and which is moved by the aneroid "beds in". The device of the present invention, which is primarily intended for automotive applications, overcomes the difficulties inherent in the prior art devices by using engine manifold vacuum to actuate the potentiometer shaft to thereby change the electrical output of the potentiometer. The manifold vacuum operates a fluid motor attached to the potentiometer shaft, and the fluid pressure level communicated to the fluid motor is adjusted as a function of the pressure level sensed by the aneroid. Therefore, a much larger force is available to actuate the potentiometer shaft, thereby avoiding the difficulties of the prior art in which the limited force output of the aneroid was often insufficient to actuate the potentiometer.

SUMMARY OF THE INVENTION

Therefore, an important object of my invention is to provide an ambient pressure sensor for use on automotive vehicles which is capable of generating an actuating force on a potentiometer at all times sufficient to adjust the wiper within the potentiometer to generate the required electrical output.

Another important object of my invention is to provide a fluid motor actuated potentiometer, the fluid pressure communicated to the fluid motor being varied as the atmospheric pressure varies, so that the fluid motor can adjust the potentiometer.

DESCRIPTION OF THE DRAWING

The sole FIGURE of the drawing is a transverse cross-sectional view of an ambient pressure sensor made pursuant to the teachings of my present invention.

DETAILED DESCRIPTION

Referring now to the drawing, an ambient pressure sensor generally indicated by the numeral 10 includes a housing generally indicated by the numeral 12 which consists of separate portions 14, 16. The portion 16 terminates in a clamping ring 18 which fits over a radially outwardly projecting lip 20 carried by the portion 14 and clamps the lip 20 and a potentiometer support 22 to the radially outwardly extending portion 24 of the housing portion 16. The support 22 includes electrical terminals 26, 28, and 30 circumferentially spaced about the outer periphery of the support 22 and which extend through the wall of the housing 12. The potentiometer support 22 carries a conventional potentiometer 32 of a design well known to those skilled in the art. Like any potentiometer, the potentiometer 32 includes a resistance illustrated schematically as at 34 and a wiper 36 which is moved axially viewing the Figure along the resistance 34 to thereby generate an electrical output which varies according to the position of the wiper 36 relative to the resistance 34. The wiper is connected to one of the terminals 26, 28 and 30, and the opposite ends of the resistance 34 are connected to the other terminals respectively. The portion 14 of the housing 12 defines a fluid motor generally indicated by the numeral 38 which consists of a piston 40 which sealingly engages the wall of the housing portion 14 by way of a seal 42 and is slidable axially within portion 14. A spring 44 yieldably urges the piston 40 to the right viewing the FIGURE. The piston 40 cooperates with the end of the portion 14 of the housing 12 to define a fluid pressure receiving chamber 46 therebetween. An inlet 48 is provided to communicate the chamber 46 with a source of vacuum, such as the engine manifold vacuum generated by operation of vehicle gasoline engines. An orifice 50 is provided to restrict communication between the chamber 46 and the inlet 48. The fluid motor 38 further includes a tube 52 which is carried by the piston 40 and which communicates with the chamber 46. The tube 52 extends axially through the potentiometer 32, and the wiper 36 is rigidly secured to the outer circumferential surface of the tube 52 and is moved relative to the resistance 34 thereby.

The portion 16 of the housing 12 defines a chamer 54 therewithin which is communicated to the ambient atmosphere through openings 56 and annular filter 58. An aneroid 60, consisting of a sealed bellows, is mounted on the end of the portion 16. As is well known to those skilled in the art, aneroids of this type, extend and retract axially in accordance with variations in the ambient atmospheric pressure. Since the aneroid 60 is conventional, it will not be descirbed in detail herein. One end 62 of the aneroid 60 is secured to the housing 12, and the other end 64 of the aneroid 60 carries a resilient valve member 66. The end of the tube 52 defines a valve seating area 68 which is adapted to cooperate with the member 66 to control communication into the passage 70 defined within the tube 52 which communicates with the chamber 46.

MODE OF OPERATION

The various components of the sensor 10 are illustrated in the FIGURE in the positions which they assume when the chamber 46 is at atmospheric pressure, i.e., before the vehicle engine is started. The spring 44 is strong enough to overcome the maximum drag of the wiper 36 of the potentiometer 32, so that the piston 40, and therefore the tube 52, is urged to the right so that the valve seat 68 carried by the tube 52 is sealingly engaged with the valve element 66. When the vehicle engine is started, a vacuum signal is communicated to the chamber 46, evacuating the latter, and therefore causing the piston 40 to move to the left viewing the FIGURE, in opposition to the spring 44. As the piston 40 moves to the left, the valve seat 68 carried by the tube 52 is moved away from the valve member 66 on the aneroid 60, thereby permitting communication of atmospheric air pressure through the passage 70 and into the chamber 46, thereby reducing the vacuum level therein. A steady state condition will quickly be reached in which the valve seat 68 defines a bleed orifice with the valve element 66 permitting just a sufficient amount of atmospheric air pressure to communicate through the passage 70 so that the vacuum level in the chamber 46 maintains the piston 40 in a stationary position.

An increase in atmospheric pressure will cause the aneroid 60 to shorten in length, therby moving the valve element 66 to the right viewing the FIGURE relative to the tube 52. Consequently, the valve element 66 will be moved away from the valve seat 68 on the tube 52, thereby increasing the communication of atmospheric air pressure through the tube 70 and reducing the vacuum level in the chamber 46. The reduced vacuum level in chamber 46 permits the spring 44 to urge the piston 40, and therefore the tube 52, to the right viewing the FIGURE. Since the wiper 36 of the potentiometer 32 is secured to the tube 52 for movement therewith, movement of the tube 36 relative to the resistance 34 changes the output signal on the terminal 30 in a manner well known to those skilled in the art. The tube 52 and piston 40 move to the right until the aforementioned atmospheric bleed orifice between the valve seat 68 and valve element 66 is established to control the proper vacuum level in the chamber 46 so that the tube will again be stationary in its new position.

A reduction in the ambient air pressure will cause the aneroid 60 to extend, thereby moving the valve element 66 into sealing engagement with the seat 68 to thereby terminate communication of atmospheric air pressure through the passage 70. Consequently, the vacuum level in the chamber 46 will increase, causing the piston 40 to move to the left viewing the FIGURE. Again, a steady state situation is quickly attained in which the valve seat 68 carried on the end of the tube 52 cooperates with the valve element 66 to adjust the proper pressure level in the chamber 46 to maintain the piston 40 in the new position. The wiper 36 will therefore be moved relative to the resistance 34, in the opposite direction from the direction it is moved when the length of the aneroid 60 decreases, so that a signal is generated which is proportional to the ambient pressure level.

I claim:

1. An ambient pressure sensor for generating an electrical signal which varies in response to changes in ambient pressure level comprising ambient pressure responsive means having a physical characteristic which varies in response to variations in ambient pressure level, a housing, a fluid motor responsive to fluid pressure to move within said housing, an actuating member carried by said fluid motor, said actuating member and said ambient pressure responsive means including valve means responsive to variations in said physical characteristic of the ambient pressure responsive means for regulating the fluid pressure communicated to said fluid motor, means responsive to movement of the fluid motor for generating an electrical signal which varies in accordance with the movements of the fluid motor, said fluid motor including means communicating the latter to a source of vacuum.

2. The invention of claim 1:
wherein said means for generating an electrical signal is a potentiometer.

3. The invention of claim 1:
wherein said ambient pressure responsive means is a sealed bellows.

4. An ambient pressure sensor for generating an electrical signal which varies in response to changes in ambient pressure level comprising ambient pressure responsive means having a physical characteristic which varies in response to variations in ambient pressure level, a housing, a fluid motor responsive to fluid pressure to move within said housing, an actuating member carried by said fluid motor, said actuating member and said ambient pressure responsive means including valve means responsive to variations in said physical characteristic of the ambient pressure responsive means for regulating the fluid pressure communicated to said fluid motor, means responsive to movement of the fluid motor for generating an electrical signal which varies in accordance with the movements of the fluid motor, said fluid motor comprising a piston slidably mounted within said housing and cooperating with one end of the latter to define a fluid receiving chamber, and means for connecting said fluid receiving chamber with a vacuum source, said valve means controlling communication of fluid pressure into said fluid receiving chamber to thereby vary the vacuum level therein to cause movement of the piston.

5. The invention of claim 4:
wherein said actuating member is a tube carried by said piston and communicating with said fluid receiving chamber, said valve means including a valve element carried by said ambient pressure responsive means and a valve seat defined on the end of the tube, said valve element and valve seat cooperating with one another in response to movement of the piston and changes in said physical characteristic of the ambient pressure responsive means to controlling communication of atmospheric pressure into said tube and therefore into said chamber.

6. The invention of claim 5:
wherein the ambient pressure responsive means is a sealed bellows which varies in length in response to variations in the ambient pressure level, said valve element being mounted on the end of said bellows so that the bellows moves the valve element toward and away from the end of the tube in response to variations in the ambient pressure level.

7. The invention of claim 6:
wherein said means for generating said electrical signal is operated by movement of said tube to generate said electrical signal.

8. The invention of claim 6:
wherein said means for generating an electrical signal is a potentiometer having a resistance and a wiper movable relative to the resistance, said wiper being carried by said tube.

9. The invention of claim 6:
wherein said piston, said tube, and said bellows are coaxial, the axial length of said bellows extending and retracting in response to changes in the ambient pressure to thereby move the valve element on the end of the bellows toward and away from the valve seat on the tube.

10. An ambient pressure sensor for generating an electrical signal which varies in response to changes in ambient pressure level comprising ambient pressure responsive means having a physical characteristic which varies in response to changes in the ambient pressure level, fluid motor means including an actuating member movable within the housing in response to changes in the fluid pressure level in said fluid motor, means responsive to variations in said physical characteristic of the ambient pressure responsive means to change the fluid pressure level in the fluid motor means, means for generating an electrical signal in response to changes of the fluid pressure level in the fluid motor, said fluid motor being communicated to a vacuum source, and said means responsive to variations in the physical characteristic of the ambient pressure responsive means includes means controlling communication of atmospheric pressure to the fluid motor to thereby vary the vacuum level therein.

11. An ambient pressure sensor for generating an electrical signal which varies in response to changes in ambient pressure level comprising ambient pressure responsive means having a physical characteristic which varies in response to changes in the ambient pressure level, fluid motor means including an actuating member movable within the housing in response to changes in the fluid pressure level in said fluid motor, means responsive to variations in said physical characteristic of the ambient pressure responsive means to change the fluid pressure level in the fluid motor means, means for generating an electrical signal in response to changes of the fluid pressure level in the fluid motor, said ambient pressure responsive means being a sealed bellows which elongates and retracts in response to changes in the ambient pressure level, said fluid motor being communicated to a vacuum source, said means responsive to variations in the physical characteristic of the ambient pressure responsive means including means communicating atmospheric pressure to said fluid motor to thereby vary the vacuum level therein, and valve means carried by said last mentioned means and by said bellows to control communication of atmospheric pressure to said fluid motor.

12. An ambient pressure sensor for generating an electrical signal which varies in response to changes in ambient pressure level comprising ambient pressure responsive means having a physical characteristic which varies in response to changes in the ambient pressure level, fluid motor means including an actuating member movable within the housing in response to changes in the fluid pressure level in said fluid motor, means responsive to variations in said physical characteristic of the ambient pressure responsive means to change the fluid pressure level in the fluid motor means, means for generating an electrical signal in response to changes of the fluid pressure level in the fluid motor, said fluid motor including a housing, a piston slidable in said housing and cooperating with one end thereof to define a fluid receiving chamber communicated to said vacuum source, said communicatng means including a tube carried by said piston cooperating with a valve element carried by said bellows to control communication of atmospheric pressure through said tube.

13. The invention of claim 12:
    wherein said means for generating an electrical signal is a potentiometer having a resistance and a wiper movable relative to the resistance, said wiper being carried by said tube.

* * * * *